United States Patent
Sekiguchi et al.

(10) Patent No.: US 10,010,085 B2
(45) Date of Patent: Jul. 3, 2018

(54) POULTRY CARCASS COOLING AND CONVEYING SYSTEM

(71) Applicant: MAYEKAWA MFG. CO., LTD., Tokyo (JP)

(72) Inventors: Mitsuaki Sekiguchi, Tokyo (JP); Masato Wakita, Tokyo (JP); Shigeki Kishita, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 1165 days.

(21) Appl. No.: 13/795,387

(22) Filed: Mar. 12, 2013

(65) Prior Publication Data
US 2014/0202659 A1 Jul. 24, 2014

(30) Foreign Application Priority Data

Jan. 23, 2013 (TW) .............................. 102102510 A (51) Int. Cl.
*A22B 5/00* (2006.01)
*A22C 21/00* (2006.01)
*A23B 4/06* (2006.01)

(52) U.S. Cl.
CPC .......... *A22B 5/0076* (2013.01); *A22B 5/0082* (2013.01); *A22C 21/00* (2013.01); *A23B 4/062* (2013.01)

(58) Field of Classification Search
CPC ............................. A22B 5/0076; A22B 5/0082
(Continued)

(56) References Cited

U.S. PATENT DOCUMENTS 3,464,558 A * 9/1969 Harvanek ............... B07B 13/05
  210/159
3,800,513 A * 4/1974 Lappin ................... B01D 47/06
  261/79.2

(Continued)

FOREIGN PATENT DOCUMENTS

AU   2007221962 A1   4/2007
GB   1011891 A  * 12/1965 ............. B65G 33/00

(Continued)

OTHER PUBLICATIONS

Corresponding European Application No. 13160134.6 Extended Search Report dated May 15, 2013.

(Continued)

Primary Examiner — Jianying Atkisson
Assistant Examiner — For K Ling
(74) Attorney, Agent, or Firm — Hauptman Ham, LLP (57) ABSTRACT

In a hollow cylindrical housing which stores a coolant, a feeding device having a rotating shaft and spiral screw vanes fixedly installed on the periphery of the rotating shaft is provided. At least one first diffusion nozzle is provided in each pitch of the screw vanes on the inner wall of the housing. A pair of second diffusion nozzles are provided for every pitch of the screw vanes on the outer periphery of the rotating shaft respectively at different positions in the axial direction of the rotating shaft and at mutually opposite positions in the circumferential direction of the rotating shaft. The first diffusion nozzles are supplied with wash water through a high-temperature water piping provided on the upper outside of the housing, while the second diffusion nozzles are supplied with wash water through a channel formed in the interior of the rotating shaft.

18 Claims, 6 Drawing Sheets

(58) Field of Classification Search
USPC .............. 165/85, 95, 108; 62/374, 378, 381; 198/494, 497; 134/65, 132; 210/159; 122/15.1
See application file for complete search history.

(56) References Cited

U.S. PATENT DOCUMENTS

| | | | | |
|---|---|---|---|---|
| 4,210,004 | A * | 7/1980 | Stoll | D06F 31/005 134/65 |
| 5,018,544 | A * | 5/1991 | Boisture | B08B 9/0323 134/111 |
| 5,437,296 | A * | 8/1995 | Citino | B08B 9/023 134/108 |
| 6,189,622 | B1 * | 2/2001 | Audet | A62C 31/02 169/16 |
| 6,764,025 | B1 * | 7/2004 | Espina | B05B 15/001 239/200 |
| 6,899,807 | B2 | 5/2005 | Cummings | |
| 7,281,384 | B2 * | 10/2007 | Morris, III | A22C 21/00 165/92 |
| 2003/0230520 | A1 * | 12/2003 | Cummings | B01D 29/01 210/85 |
| 2007/0287371 | A1 * | 12/2007 | Morris, III | A22C 21/0061 452/173 |

FOREIGN PATENT DOCUMENTS

| | | | | |
|---|---|---|---|---|
| GB | 1293603 | A * | 10/1972 | ............... A01C 7/16 |
| JP | 62033917 | A * | 2/1987 | |
| JP | 2008295446 | A | 12/2008 | |
| JP | 2008295447 | A * | 12/2008 | |
| JP | 2010136651 | A * | 6/2010 | |

OTHER PUBLICATIONS

Office Action in KR Application No. 10-2013-0015565, dated Aug. 17, 2017, 10pp.

* cited by examiner

POULTRY CARCASS COOLING AND CONVEYING SYSTEM

RELATED APPLICATIONS

The present application is based on, and claims priority from, Taiwanese Application Number 102102510, filed Jan. 23, 2013, the disclosure of which is hereby incorporated by reference herein in its entirety.

BACKGROUND OF THE INVENTION

Field of the Invention

This invention relates to a cooling and conveying apparatus having spiral screw vanes for use in a cooling process to be performed in treatment of poultry carcasses for consumption.

Description of the Related Art

A poultry carcass is sequentially subjected to a bleeding treatment, a scalding treatment and a feather plucking treatment, and then to evisceration. The poultry carcass is washed as pretreatment, and then the poultry carcass having a body temperature of 38 to 42° C. is cooled to a target temperature of 5 to 7° C. in order to prevent propagation of bacteria. This cooling is generally performed by a continuous immersion cooling technique that is highly efficient. Specifically, according to this cooling technique, a bactericide such as sodium hypochlorite is added to a coolant of 2 to 3° C. in chiller tank. Poultry carcasses which are sequentially transported are introduced into the chiller tank, immersed in the coolant containing the bactericide for a certain period of time so that the poultry carcasses are cooled and sterilized.

The inventors of this invention have proposed a poultry carcass cooling apparatus having spiral screw vanes incorporated therein and a cylindrical housing filled with a coolant, and designed to rotate the screw vanes about an axis so that a poultry carcass is cooled while being conveyed from the inlet to the outlet of the cylindrical housing (Japanese Patent Application Publication Nos. 2008-295446 and 2010-136651). This apparatus, unlike conventional ones, is of an enclosed type, not an open type, and the number of poultry carcasses that can be accommodated is increased by setting the coolant level in the tank higher, and thus the space required to install the apparatus is reduced. This apparatus further provides advantages that traceability of the poultry carcasses can be ensured by sequentially transporting the poultry carcasses from the inlet to the outlet of the housing while cooling the carcasses, and CIP cleaning can be performed after completion of the treatment by providing flushing nozzles for spraying wash water in the inside of the housing.

According to the CIP cleaning method described in Japanese Patent Application Publication Nos. 2008-295446 and 2010-136651, flushing nozzles are provided on the rotating shaft of the screw vanes and on the inner wall of the housing. Wash water is sprayed from the flushing nozzle provided on the rotating shaft toward the inner wall of the housing to clean the sides of the carcasses facing the inner wall of the housing, while wash water is sprayed from the flushing nozzle provided on the inner wall of the housing toward the rotating shaft to clean the sides of the carcasses facing the rotating shaft.

According to the CIP cleaning method described in Japanese Patent Application Publication Nos. 2008-295446 and 2010-136651, a flushing nozzle is provided for every two pitches of the screw vanes on the rotating shaft and the inner wall of the housing. The screw vanes having spiral complicated curved vanes often obstruct the wash water sprayed from the flushing nozzles provided on the rotating shaft toward the inner wall of the housing depending on positions where the flushing nozzles are placed. Additionally, depending on positions where the flushing nozzles provided on the inner wall of the housing are placed, the curved surfaces of the screw vanes possibly form blind areas where no wash water sprayed from the flushing nozzles reaches. Therefore, the CIP cleaning method described in Japanese Patent Application Publication Nos. 2008-295446 and 2010-136651 may be unable to clean the screw vanes, the rotating shaft and the inner wall of the housing sufficiently in a short period of time.

SUMMARY OF THE INVENTION

In view of the problems of the conventional techniques as described above, an object of the invention is to provide a CIP cleaning method for use in a cooling and conveying system for poultry carcasses which is able to reliably clean screw vanes, a rotating shaft and the inner wall of a housing.

This invention is applied to a poultry carcass cooling and conveying system including: a hollow cylindrical housing having a coolant stored therein; a feeding device composed of a rotating shaft provided in an interior of the housing in a longitudinal direction of the housing, and spiral screw vanes fixedly installed on a periphery of the rotating shaft; a coolant circuit connected to an inlet and an outlet of the housing; a decontamination unit and a heat exchanger provided in the coolant circuit; a first flushing nozzle provided on an inner wall of the housing to spray wash water toward the feeding device; and a second flushing nozzle provided on the rotating shaft to spray wash water toward the inner wall of the housing.

In order to achieve the object described above, in the CIP cleaning unit according to the invention, the first flushing nozzle is a diffusion nozzle which is provided in plurality, at least one in each pitch of the screw vanes. The second flushing nozzle is a diffusion nozzle which is provided in pairs for every pitch of the screw vanes, the paired second flushing nozzles are provided at different positions in an axial direction of the rotating shaft and at mutually opposite positions in a circumferential direction of the rotating shaft respectively, and the second flushing nozzle is an embedded-type nozzle, the body of which is embedded in an outer periphery of the rotating shaft. The diffusion nozzles are nozzles capable of spraying wash water in a spray angle of 60 degrees or more, and may be diffusion nozzles having a known configuration. The use of such diffusion nozzles makes it possible to enlarge the area where wash water can be sprayed and to reduce the read area where the wash water cannot be sprayed.

A unit for supplying wash water to the first and second flushing nozzles is configured such that the first flushing nozzles are supplied with wash water through a piping provided along a partition wall of the housing and the second flushing nozzles are supplied with wash water through a channel formed in an interior of the rotating shaft. This makes it possible to supply wash water simply at a low cost.

The second flushing nozzles are embedded nozzles each having a body embedded in the outer periphery of the rotating shaft. Therefore, a poultry carcass can be transported toward the outlet of the housing without being obstructed by the second flushing nozzles and without the risk that the poultry carcass is damaged by the second flushing nozzles.

According to the invention, the first flushing nozzles are provided on the inner wall of the housing, at least one in each pitch of the screw vanes. Since the position in an axial direction of a screw vane facing the first flushing nozzle shifts together with rotation of the screw vanes, at least one first flushing nozzle can be provided at each pitch of the screw vanes so that the wash water is sprayed to the entire area of the screw vanes in that pitch. Thus, the dead angle area is eliminated from the spray area of the first flushing nozzles for the rotating shaft and the screw vanes, and the entire area of these members can be cleaned reliably. Only one first flushing nozzle can be provided in each pitch of the screw vanes. In this case, the number of first flushing nozzles can be reduced, and the cost can be reduced.

The second flushing nozzles are provided in pair in each pitch of the screw vanes. Each pair of second flushing nozzles are arranged on the outer periphery of the rotating shaft, at positions differing in a axial direction of the rotating shaft and at mutual opposite positions in a circumferential direction of the rotating shaft. This eliminates the dead angle area on the inner wall of the housing where no wash water is sprayed, and hence the entire area of the inner wall of the housing can be cleaned reliably during CIP cleaning.

The cooling and conveying system according to the invention further has a coolant circuit connected to the inlet and outlet of the housing, and a decontamination unit and a heat exchanger provided in the coolant circuit. This makes it possible to reuse the coolant by decontaminating the coolant by the decontamination unit, then regulating the temperature of the coolant which has been raised after being used for cooling, by means of the heat exchanger, and introducing the coolant again into the inlet of the housing.

In an embodiment of the invention, the first flushing nozzles provided on the inner wall of the housing can be arranged at smaller pitch intervals than the pitch interval of the screw vanes. This makes it possible to arrange at least one first flushing nozzle in each pitch of the screw vanes, and thus to prevent a part of the wash water spraying region of the rotating shaft and the screw vanes from being omitted. In addition, the provision of the first flushing nozzles at smaller regular intervals than the pitch intervals of the screw vanes makes it easy to determine positions where the first flushing nozzles are arranged.

In an embodiment of the invention, each of the second flushing nozzles provided on the rotating shaft can be arranged to axially accord with a position of the base of the screw vane located at a directly opposite position in a circumferential direction of the rotating shaft. This makes it possible to arrange each second flushing nozzle at the center of the pitch between the screw vanes in an axial direction of the rotating shaft on which the second flushing nozzle is provided. This means that the screw vanes are located apart from the second flushing nozzle, and hence wash water sprayed from the second flushing nozzle is allowed to reach the inner wall of the housing without being obstructed by the screw vanes.

In an embodiment of the invention, a discharge section for discharging a cooled poultry carcass out of the housing can be provided at an outlet end of the housing. This discharge section is formed, for example, of a short-axis cylindrical housing having an inlet port formed on the outlet-end-side end face of the housing for receiving a poultry carcass, and a discharge port formed on the outlet-end-side upper end face. The discharge section further has, within the short-axis cylindrical housing, a second rotating shaft arranged in the same direction as the rotating shaft in the housing, and a plurality of buckets provided around the second rotating shaft to be rotatable about the second rotating shaft, and designed to receive a poultry carcass, lift it up, and discharge the poultry carcass through the discharge port.

According to the configuration as described above, a poultry carcass which has been conveyed to the outlet end of the housing while being cooled in the housing is placed within a bucket present within the short-axis cylindrical housing, in an lower part of the housing. The bucket having the poultry carcass stored therein turns about the second rotating shaft. Thus, the poultry carcass stored in the bucket is lifted up to reach an upper area in the short-axis cylindrical housing and is discharged to the discharge port.

Further, this short-axis cylindrical housing has a jacket provided around the second rotating shaft, and a plurality of third diffusion nozzles respectively provided at a plurality of positions in a circumferential direction on the outer periphery of the jacket for spraying wash water toward the inner wall of the short-axis cylindrical housing, and a second wash water supply unit for supplying wash water to the third diffusion nozzles through a channel formed in the inside of the second rotating shaft. A cleaning unit thus configured enables CIP cleaning, after shutdown of the system, to remove stains from the inner wall of the short-axis cylindrical housing and the members provided therein, particularly stains such as fat from poultry carcasses adhered on the buckets.

In an embodiment of the invention, the decontamination unit can be configured as described below. For example, the decontamination unit includes: a tank having an inlet port and a discharge port for the coolant; a screen a lower part of which is immersed in a coolant stored in the tank and an upper part of which has comb-like gaps provided to protrude above the surface of the coolant; a rake for lifting a contaminant adhered on the screen and a unit for moving the rake; and a fourth diffusion nozzle for spraying wash water to the screen and the endless conveyor belt. This configuration makes it possible to decontaminate and clean the coolant that has been used for cooling a poultry carcass, and to discharge the contaminant collected by the screen to the outside of the tank. Further, after shutdown of the system, the screen and the rake can be subjected to CIP cleaning using the fourth diffusion nozzle.

In the foregoing embodiment, the fourth diffusion nozzle has a nozzle body formed of a hollow spherical body having a large number of spray holes directed to all directions so as to be able to spray wash water to all directions. This enables the fourth diffusion nozzle to spray wash water to all directions so that not only the screen and the rake but also the peripheral members can be cleaned.

In an embodiment of the invention, a coolant circuit is formed, and a fifth diffusion nozzle can be provided for spraying wash water to the inside of a duct connecting between the outlet of the housing and the decontamination unit.

According to this invention, the inner wall of the housing and the feeding device formed of the rotating shaft and the screw vanes can be CIP cleaned entirely and reliably by the diffusion flushing nozzles provided on the inner wall of the housing and the rotating shaft of the screw vanes.

DESCRIPTION OF THE PREFERRED EMBODIMENTS

The invention will be described in detail based on an exemplary embodiment shown in the accompanying drawings. It should be understood that dimensions, materials, shapes and relative arrangement of components described in this embodiment are for the purposes of illustration only and not limitation unless otherwise specifically noted.

Figure 1:
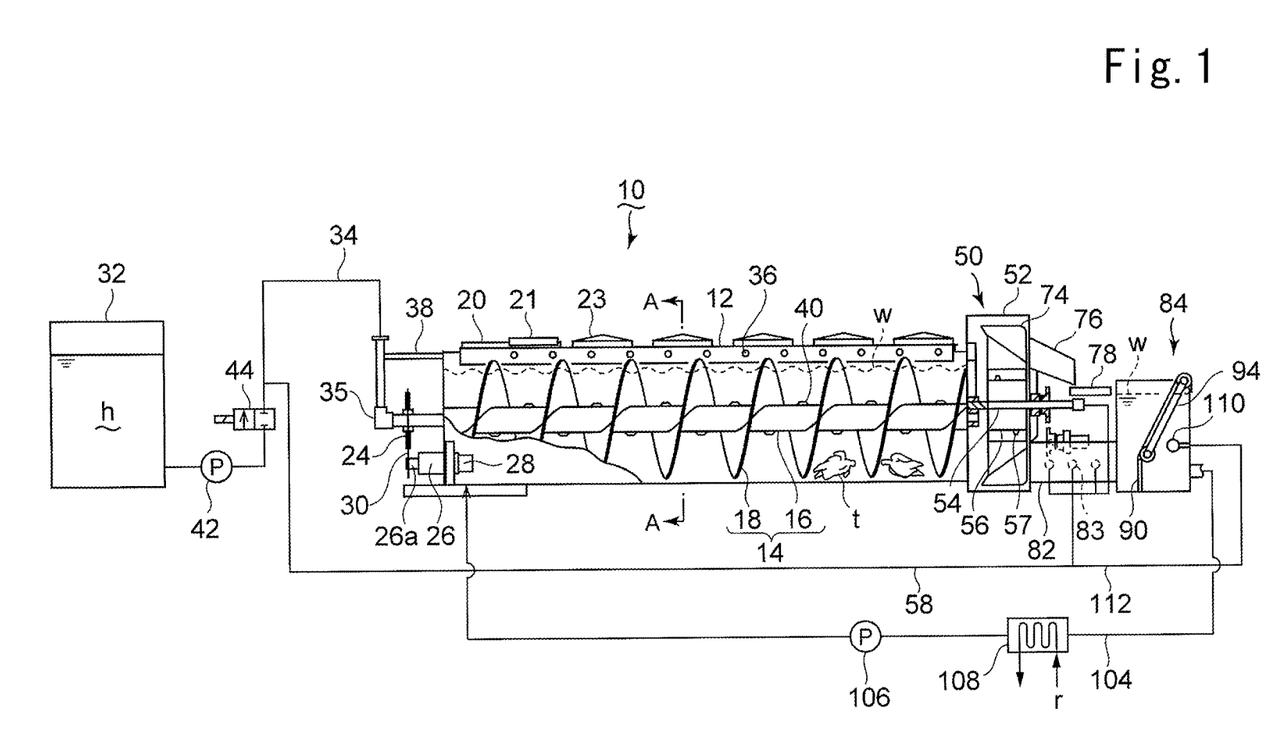
FIG. 1 is a diagram illustrating an overall configuration of a cooling and conveying system according to an embodiment of the invention.
Figure 2:
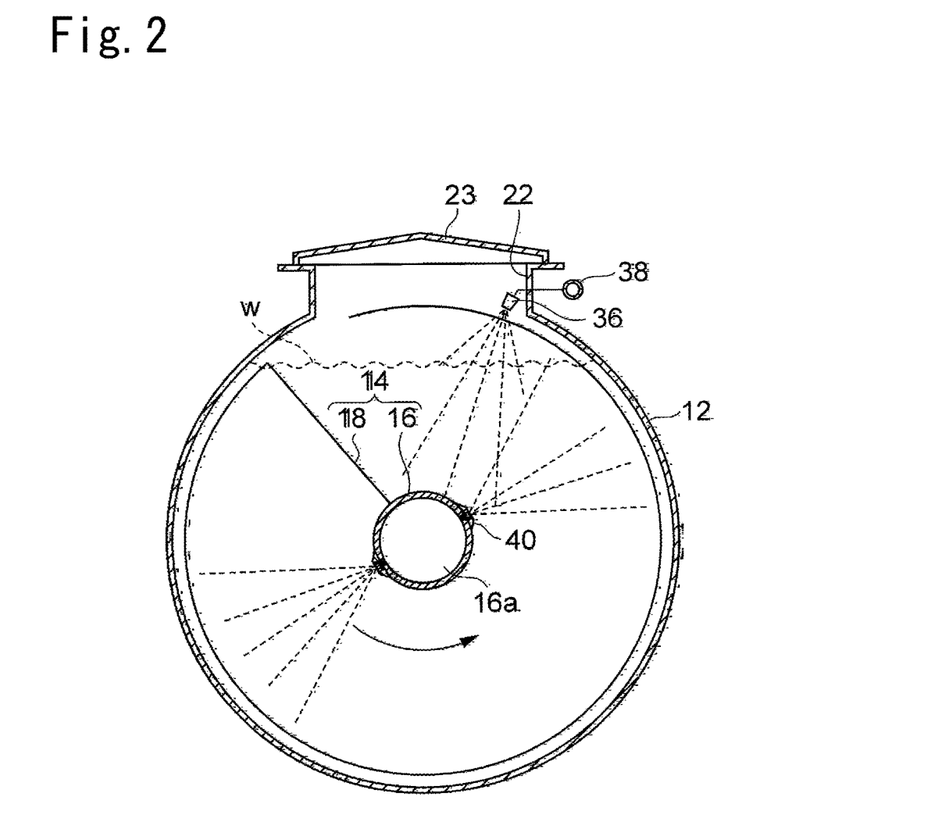
FIG. 2 is a cross-sectional view taken along line A-A in FIG. 1.

A cooling and conveying system for poultry carcasses according to an embodiment of the invention will be described with reference to FIGS. 1 to 6. FIG. 1 is an overall view of a cooling and conveying system 10 according to the embodiment. As shown in FIGS. 1 and 2, the cooling and conveying system 10 includes a hollow cylindrical housing 12 elongated in an axial direction. There is provided, within this housing 12, a feeding device 14 composed of a rotating shaft 16 arranged in a longitudinal direction of the housing 12, and spiral screw vanes 18 provided on the outer periphery of the rotating shaft 16. A carcass inlet port 20 is provided at an upper part of an end of the housing 12 so that poultry carcasses are introduced into the housing 12 through this carcass inlet port 20. The carcass inlet port 20 is provided with a sliding door 21 so that the carcass inlet port 20 can be opened and closed with this door 21.

As shown in FIG. 2, a plurality of inspection holes 22 are in an upper part of the housing 12 other than the area where the carcass inlet port 20 is provided, such that the inspection holes 22 are arranged in a longitudinal direction. These inspection holes 22 are closed with a cover 23 during operation of the cooling and conveying system 10.

One end of the rotating shaft 16 is extended out of the housing 12 to define an external end, and a chain wheel 24 is provided on this external end. A reducer 26 and a motor 28 are provided adjacent to the external end of the rotating shaft 16. A chain 30 is wound between the chain wheel 24 and an output shaft 26a of the reducer 26, whereby the rotating shaft 16 is allowed to rotate at a low speed by the motor 28 via the reducer 26. A high-temperature water tank 32 is provided at a position away from the housing 12. The high-temperature water tank 32 is desirably placed at a position separated from the housing 12 by such a distance that heat from the high-temperature water tank 32 will not be transferred to the housing 12. High-temperature water h stored in the high-temperature water tank 32 is used as wash water for CIP cleaning that is performed during shutdown of the cooling and conveying system 10.

A high-temperature water channel 16a is formed in the inside of the rotating shaft 16 (see FIG. 2). A high-temperature water piping 34 is connected to the high-temperature water tank 32 and to the external end of the rotating shaft 16. The high-temperature water piping 34 and the rotating shaft 16 are connected via a rotatable joint 35 such that a fluid channel is ensured and the rotating shaft 16 is rotatable. This makes it possible to supply the high-temperature water h stored within the high-temperature water tank 32 into the high-temperature water channel 16a when CIP cleaning is performed. A plurality of diffusion nozzles 40 are provided on the rotating shaft 16, and the high-temperature water his sprayed from the diffusion nozzles 40 to the inside of the housing 12. A high-temperature water piping 38 branched from the high-temperature water piping 34 is arranged outside of the upper outer periphery of the housing 12 in a longitudinal direction of the housing 12.

A plurality of diffusion nozzles 36 are provided in an axial direction on the inner wall of a partition wall of the housing 12 forming the inspection holes 22. The diffusion nozzles 36 are connected to the high-temperature water piping 38 so that the high-temperature water h is sprayed from the diffusion nozzle 36 to the inside of the housing 12 when the CIP cleaning is performed. In the description of this embodiment, the term "diffusion nozzle" means a nozzle having a spray angle of 60 degrees or more and designed to be able to spray high-temperature water in a conical shape. This type of diffusion nozzle is conventionally known, and a diffusion nozzle having a conventional configuration can be used in this embodiment. The high-temperature water piping 34 is provided with a high-temperature water pump 42 and an on-off valve 44 for supplying the high-temperature water to the high-temperature water pipings 34 and 38.

Figure 3:
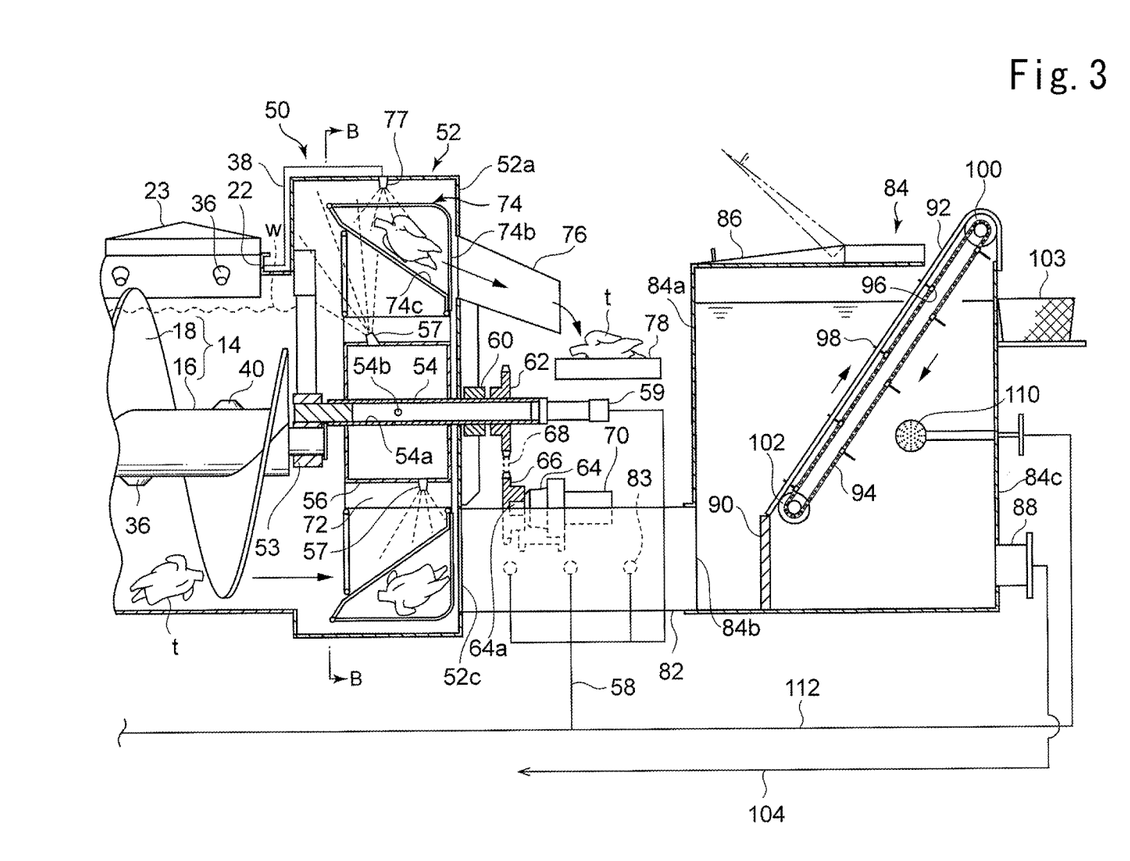
FIG. 3 is a longitudinal sectional view showing part of the cooling and conveying system.
Figure 4:
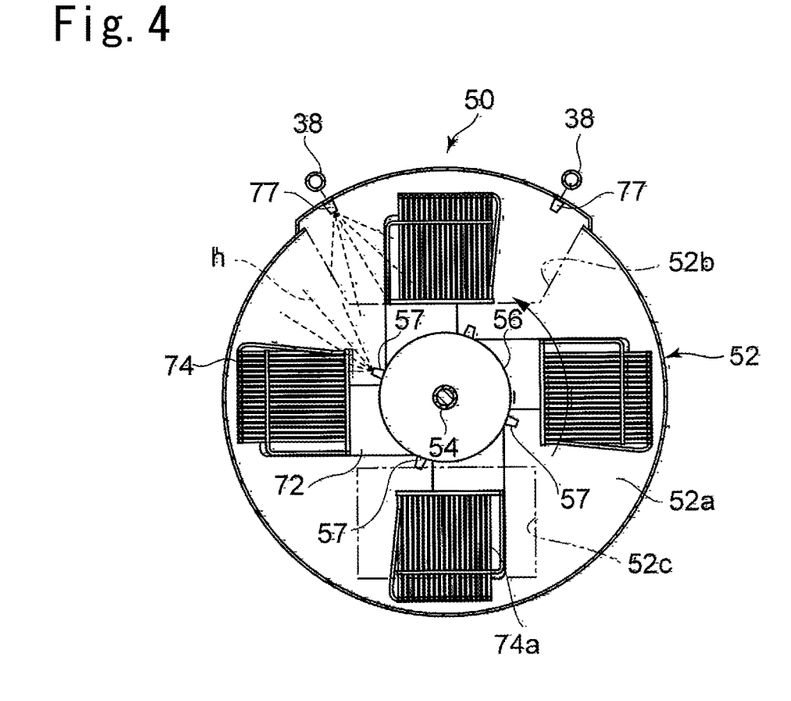
FIG. 4 is a cross-sectional view taken along line B-B in FIG. 3.
Figure 5:
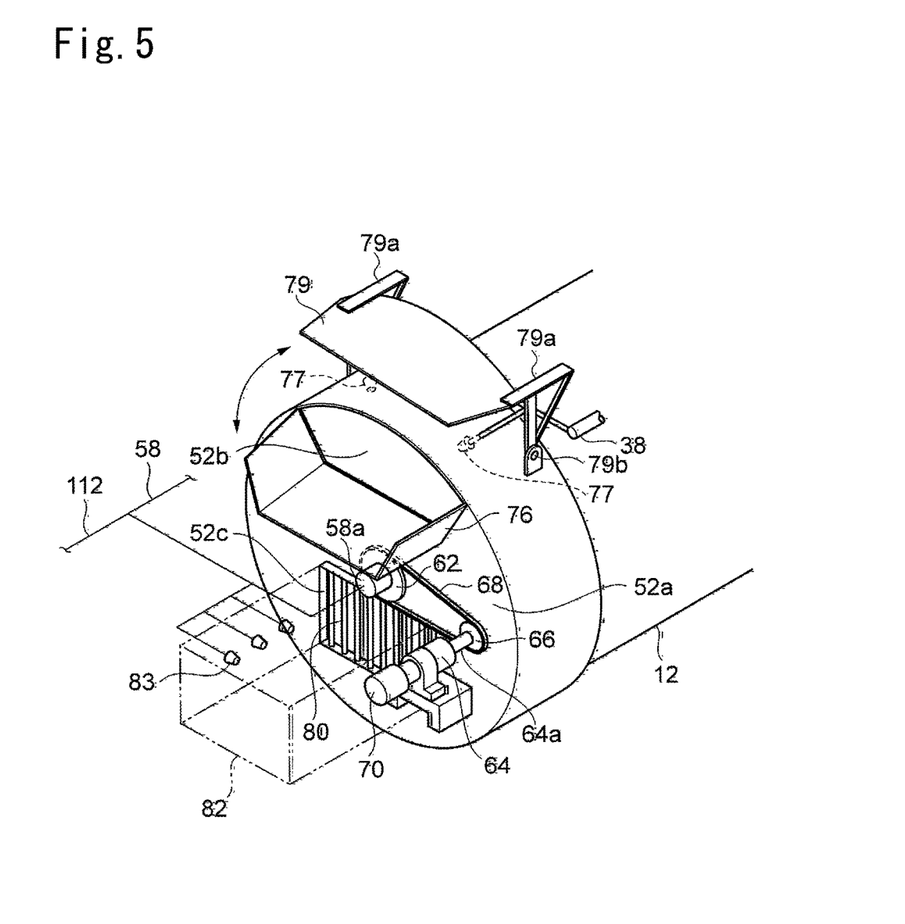
FIG. 5 is a perspective view showing a short-axis cylindrical housing of the cooling and conveying system.

In the configuration as described above, a coolant w at a temperature of 2 to 3° C. is injected to the housing 12 until the surface level of the coolant w is raised to the vicinity of the carcass inlet port 20. In this state, a large amount of poultry carcasses t are introduced into the housing through the carcass inlet port 20. The introduced poultry carcasses t are conveyed to the outlet side by the rotating screw vanes 18 while being cooled with the coolant w. A carcass discharge section 50 is provided at the outlet end of the housing 12. Referring to FIGS. 3 to 5, a configuration of the carcass discharge section 50 and a screen tank 84 provided downstream of the carcass discharge section 50.

As shown in FIG. 3, a hollow short-axis cylindrical housing 52 forming the carcass discharge section 50 is connected to the outlet end of the housing 12. A rotating shaft 54 is provided in the inside of the short-axis cylindrical housing 52 to extend in the same direction as the rotating shaft 16. The rotating shaft 16 and the rotating shaft 54 are respectively supported rotatably by a bearing 53 fixed to a wall of the short-axis cylindrical housing 52. A hollow jacket 56 is provided around the rotating shaft 52. A high-temperature water channel 54a is formed in the inside of the rotating shaft 54, and one end of the rotating shaft 54 is extended to the outside of the short-axis cylindrical housing 52 to define an external end. A high-temperature water piping 58 branched from the high-temperature water piping 34 is extended to this external end via a rotatable joint 59, so that high-temperature water h can be supplied from the high-temperature water piping 58 to the high-temperature water channel 54a.

A through hole 54b is formed through the partition wall of the rotating shaft 54 covered with the jacket 56, and a plurality of diffusion nozzles 57 are provided on the outer periphery of the jacket 56 such that they are distributed in the circumferential direction. Thus, the high-temperature water his sprayed from the diffusion nozzles 57 when the CIP cleaning is performed after operation of the cooling and conveying system 10 is stopped. Using this high-temperature water h, peripheral members including the inner wall of the short-axis cylindrical housing 52 and buckets 74 to be described later can be cleaned.

A bearing 60 having an O-ring and an oil seal is provided at a pass-through portion where the rotating shaft 54 passes through the short-axis cylindrical housing 52. This bearing 60 not only rotatably supports the rotating shaft 54, but also prevents the coolant w within the short-axis cylindrical housing 52 from leaking out. The external end of the rotating shaft 54 extended out of the bearing 60 has a chain wheel 62 fixed thereto. An output shaft 64a of the reducer 64 is arranged at a position facing the chain wheel 62. A chain wheel 66 is fixed to the rotating shaft 64a, and a chain 68 is wound between the chain wheel 62 and chain wheel 66. Thus, the rotating shaft 54 is allowed to rotate at a low speed by a motor 70 via the reducer 64.

As shown in FIG. 4, four buckets 74 are provided at regular intervals on the outer periphery of the jacket 56 via a support plate 72. The rotating shaft 54, the jacket 56 and the buckets 74 rotate together in the direction indicated by the arrow. Each of the buckets 74 has an inlet port 74a at the front end in the direction of rotation for receiving poultry carcasses t, and an outlet opening 74b at a face perpendicular to the inlet port 74a (the face facing the outlet-side end face 52a of the short-axis cylindrical housing 52). The partition wall of the bucket 74 except the inlet port 74a and the outlet opening 74b is formed by a comb-like screen having gaps so as to enable circulation of the coolant w.

A carcass discharge port 52b is formed in an upper area of the outlet-side end face 52a of the short-axis cylindrical housing 52, and the carcass discharge port 52b is provided with a discharge chute 76 having a U-shaped cross section. When the bucket 74 reaches the upper end position to face the carcass discharge port 52b, a surface 74c defining the bottom of the bucket 74 forms a slope connected to the bottom face of the discharge port 52b.

In the configuration as described above, a poultry carcass t that has been conveyed through the inside of the housing 12 storing the coolant w to the vicinity of the outlet end, enters the short-axis cylindrical housing 52 together with the coolant w, and is introduced into the bucket 74 through the inlet port 74a of a bucket 74 that is located at a lower part of the short-axis cylindrical housing 52. When the bucket 74 accommodating the poultry carcass t reaches the upper end position due to rotation of the rotating shaft 54, the poultry carcass t slides on the slope 74c, passes through the carcass discharge port 52b and slides down on the discharge chute 76. A belt conveyor 78 or the like is provided below the discharge chute 76 so that the poultry carcasses t are sequentially conveyed to the downstream process by the belt conveyor 78.

As shown in FIG. 4, a pair of diffusion nozzles 77 are provided on the inner surface at the upper end of the short-axis cylindrical housing 52. These diffusion nozzles 77 are arranged with a space therebetween and such that they spray toward the rotating shaft 54. More number of diffusion nozzles 77 may be provided. The high-temperature water piping 38 is extended to above the short-axis cylindrical housing 52, and the diffusion nozzles 77 are connected to the high-temperature water piping 58. When CIP cleaning is performed, high-temperature water is sprayed from the diffusion nozzles 77 to clean the buckets 74, the rotating shaft 54 and other members located below the diffusion nozzles 77.

As shown in FIG. 5, a cover 79 is provided on an upper end outer periphery of the short-axis cylindrical housing 52. The cover 79 is integrally provided with a pair of arms 79a, and each of the arms 79a is connected rotatably about a pivot 79b on the outer periphery of the short-axis cylindrical housing 52. The carcass discharge port 52b is closed with the cover 79 during CIP cleaning, whereby the high-temperature water h can be prevented from spattering out of the short-axis cylindrical housing 52.

As shown in FIG. 5, a coolant discharge port 52c is formed in a lower part of the outlet-side end face 52a of the short-axis cylindrical housing 52. The coolant discharge port 52c is provided with a grating 80 for preventing passage of a poultry carcass t. A duct 82 having a rectangular cross section is connected to the coolant discharge port 52c, and a screen tank 84 is connected to the other end of the duct 82. A plurality of (three in the drawing) diffusion nozzles 83 are provided on the inner wall of the duct 82. The diffusion nozzles 83 are connected to the high-temperature water piping 58, and are able to spray high-temperature water h toward the inner wall of the duct 82 during CIP cleaning.

As shown in FIG. 3, an inlet port 84b is formed in the front-end-side partition wall 84a of the screen tank 84, at a connection with the duct 82, so that a coolant w flows into the inlet screen tank 84 through the opening 84b. Additionally, an opening for maintenance and inspection is formed in the upper wall of the screen tank 84, and a cover 86 is provided to close this opening when CIP cleaning is performed.

A coolant discharge pipe 88 is connected to the rear-end-side partition wall 84c facing the inlet port 84b. A partition wall 90 is provided between the inlet port 84b and the coolant discharge pipe 88. A part of the partition wall 90 is removed to provide a screen 92 therein. Comb-like gaps extending vertically are formed in the screen 92 to allow the coolant w to pass through, so that any contaminant in the coolant w can be trapped when the coolant w passes between the gaps. An upper part of the screen 92 protrudes out from an open space formed in the top of the screen tank 84 and the upper end is extended to the outside of the rear-end-side partition wall 84c.

A pair of endless chains 94 are arranged on the back side of the screen 92. A bar 96 is installed between the pair of endless chains 94, and the bar 96 is provided with a large number of rakes 98. The rakes 98 protrude to the surface side of the screen 92 through gaps formed in the screen 92. The pair of endless chains 94 are wound around wheels 100 and 102 respectively provided at upper and lower ends of the screen 92, and move in the direction indicated by the arrows. The rakes 98 scrape up the contaminant collected by the screen 92. A basket 103 is provided below the upper end of the screen 92 so that the contaminant falling from the upper end of the screen 92 is placed in the basket 103.

Thus, the coolant which has flown into the screen tank 84 from the short-axis cylindrical housing 52 through the duct 82 is decontaminated in the screen tank 84 and discharged from the coolant discharge pipe 88.

As shown in FIG. 1, the coolant w discharged into the coolant discharge pipe 88 is returned to a heat exchanger 108 through a coolant circuit 104. There are provided, in the coolant circuit 104, a coolant pump 106 for returning the coolant w to the inlet end of the housing 12, and a heat exchanger 108 for recooling the coolant w to adjust the temperature thereof to 2 to 3° C. The heat exchanger 108 is supplied with a refrigerant r from a refrigerating machine (not shown) and the coolant w is cooled by heat exchange with the refrigerant r.

As shown in FIG. 3, a spherical diffusion nozzle 110 is provided between the screen 92 and the rear-end-side partition wall 84c. This spherical diffusion nozzle 110 has nozzle body formed into a hollow spherical shape, and a large number of holes are dispersedly arranged all over the surface of this spherical body. The spherical diffusion nozzle 110 is connected to the high-temperature water piping 112 branched from the high-temperature water piping 58, and is able to spray the high-temperature water h during CIP cleaning. The spherical diffusion nozzle 110 is able to spray the high-temperature water h in all directions from the spray holes arranged all around the body.

Figure 6:
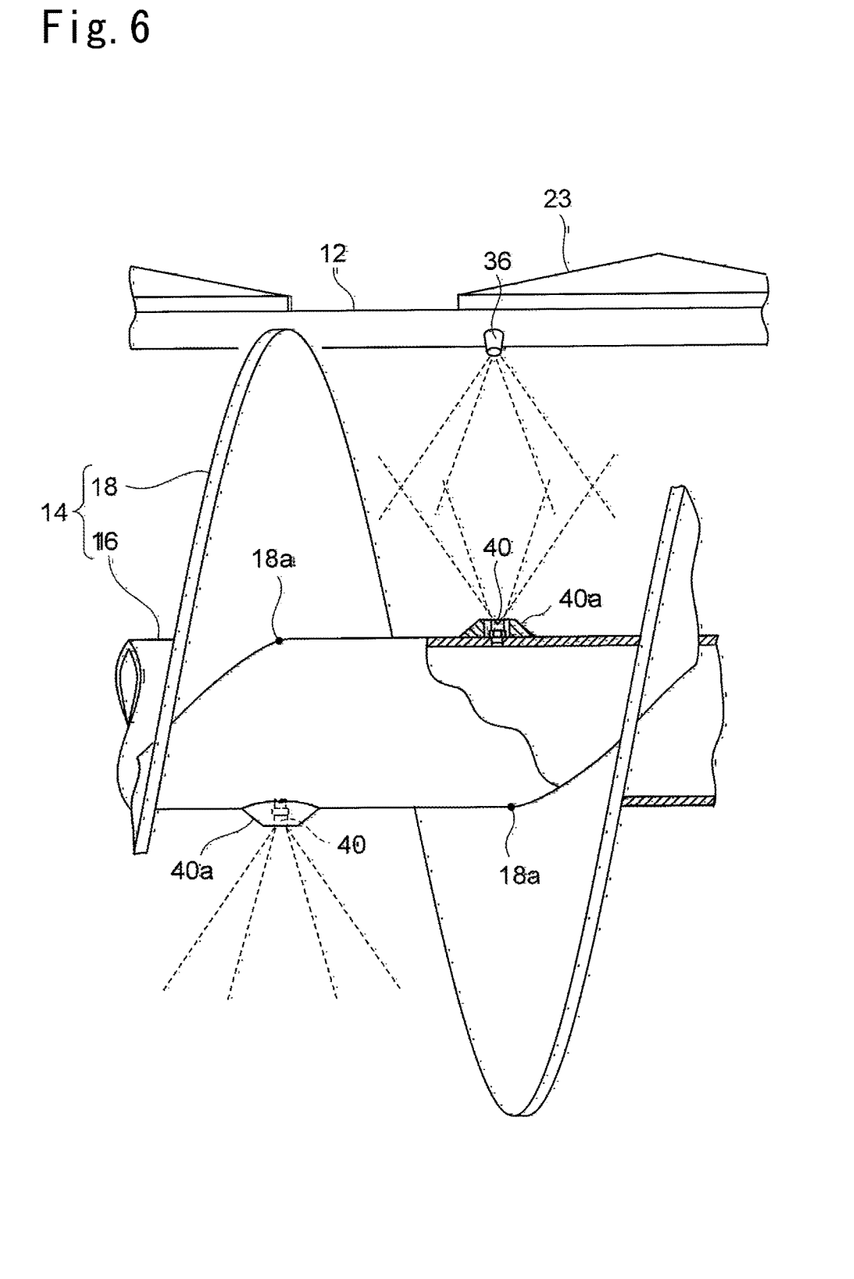
FIG. 6 is a partial enlarged view of FIG. 1 illustrating a feeding device.

A configuration and arrangement of the diffusion nozzles 36 and 40 provided in the housing 12 will be described in more detail with reference to FIG. 6. As shown in FIG. 6, diffusion nozzles 36 provided on the inner wall of the housing 12 are arranged in an axial direction of the rotating shaft 16 at regular intervals with a smaller pitch distance than the pitch distance of the screw vanes 18. According to this, at least one diffusion nozzle 36 is arranged at every pitch of the screw vanes 18. The screw vanes 18 move in the axial direction from one pitch to another in one rotation. Therefore, the vane surfaces of the screw vanes 18 entirely passes a position that faces the diffusion nozzle 36. This means that the high-temperature water h can be sprayed to all over the vane surfaces of the screw vanes 18 by providing at least one diffusion nozzle 36 at every pitch. This makes it possible to clean the entire area of the screw vanes 18 with the diffusion nozzles 36.

The spraying direction of each of the diffusion nozzles 40 provided on the outer periphery of the rotating shaft 16 is directed to the wall of the housing 12. The diffusion nozzles 40 are of an embedded type, and hence do not protrude out much from the outer periphery of the rotating shaft 16, and a conical cover 40a having a flat top surface is arranged around the protruded portion of the diffusion nozzles 40. Therefore, diffusion nozzle 40 is concealed with the cover 40a. This enables the screw vanes 18 to transport a poultry carcass without obstruction and without the risk that the poultry carcass is damaged by hitting against the diffusion nozzles 40.

A pair of diffusion nozzles 40 are provided at each pitch of the screw vanes 18. The pair of diffusion nozzles 40 are arranged at positions differing by 180 degrees in a circumferential direction of the rotating shaft 16. In other words, they are arranged at opposite positions on the rotating shaft 16. The axial positions of the pair of diffusion nozzles 40 on the rotating shaft 16 are differed by a half pitch of the screw vanes 18. Each of the diffusion nozzles 40 is arranged at a position which is differed from the position where the screw vane 18 present in the same axial position is connected (the position of a midpoint 18a in FIG. 6) by 180 degrees in a circumferential direction. As a result, no screw vane 18 is arranged in the vicinity of the diffusion nozzles 40, and hence the high-temperature water h ejected from the diffusion nozzles 40 can be sprayed to the entire area of the inner wall of the housing 12 without being obstructed by the screw vanes 18.

The short-axis cylindrical housing 52 is configured such that high-temperature water is sprayed, during CIP cleaning, not only from the plurality of diffusion nozzles 57 provided on the outer periphery of the jacket 56 but also from the pair of diffusion nozzles 79 provided on the inner wall of the upper end of the housing, whereby the inside of the short-axis cylindrical housing 52 also can be cleaned. In particular, the cleaning effect for the bucket 74 having a complicated screen shape can be improved significantly by being sprayed with the high-temperature water h from both the inside and the outside. Further, since the high-temperature water h can be supplied to the diffusion nozzles 57 via the channel 54a formed within the rotating shaft 54, the piping configuration can be simplified and the piping cost can be reduced.

Additionally, the carcass discharge port 52b is closed with the cover 79 during CIP cleaning, whereby the high-temperature water h can be prevented from spattering out of the short-axis cylindrical housing 52.

Further, the plurality of diffusion nozzles 83 are provided in the inside of the duct 82, whereby the inside of the duct 82 also can be CIP cleaned.

Further, the spherical diffusion nozzle 110 capable of spraying the high-temperature water in all directions is provided within the screen tank 84, whereby peripheral members around the spherical diffusion nozzle 110 can be cleaned during CIP cleaning. Since the spherical diffusion nozzle 110 is disposed on the rear side of the screen 92 and the endless conveyor belt 98, the effect of cleaning the screen 92 and the endless conveyor belt 98 which are likely to be contaminated with contaminant contained in the coolant can be improved.

Although, in this embodiment, the spherical diffusion nozzle 110 is provided only in the screen tank 84, the diffusion nozzles 36 provided on the inner wall of the housing, the diffusion nozzles 77 provided in the short-axis cylindrical housing 52, or the diffusion nozzles 83 provided in the duct 82 may also be spherical diffusion nozzles. Further, in place of the spherical diffusion nozzle, a rotary cleaning nozzle (rotary diffusion nozzle) may be used, in which one or more nozzles rotate 360 degrees about one axis so that high-temperature water can be sprayed in directions of 360 degrees.

According to the invention, the CIP cleaning effect for internal devices of a poultry carcass cooling and conveying system can be improved.

FIG. 2

A-A CROSS SECTION

FIG. 4

B-B CROSS SECTION

What is claimed is:

1. A poultry carcass cooling and conveying system comprising:
   a hollow cylindrical housing having a coolant stored therein;
   a feeding device composed of a rotating shaft provided in an interior of the housing in a longitudinal direction of the housing, and spiral screw vanes fixedly installed on a periphery of the rotating shaft;
   a coolant circuit connected to an inlet and an outlet of the housing, and a decontamination unit and a heat exchanger provided in the coolant circuit;
   a first flushing nozzle provided on an inner wall of the housing to spray wash water toward the feeding device; and
   a second flushing nozzle provided on the rotating shaft to spray wash water toward the inner wall of the housing, wherein
   the first flushing nozzle being a diffusion nozzle which is provided in plurality, at least one in each pitch of the screw vanes,
   the second flushing nozzle being a diffusion nozzle which is provided in pairs for every pitch of the screw vanes,
   the paired second flushing nozzles being provided at different positions in an axial direction of the rotating shaft and at mutually opposite positions in a circumferential direction of the rotating shaft respectively,
   the second flushing nozzle being an embedded-type nozzle, the body of which is embedded in an outer periphery of the rotating shaft,
   the poultry carcass cooling and conveying system further comprising
   a wash water supply unit which supplies wash water to the first flushing nozzles and supplies wash water to the second flushing nozzles during CIP cleaning; wherein the wash water supply unit includes:

a pump that applies pressure on the wash water during the CIP cleaning;

an on-off valve provided to a downstream side of the pump;

a water piping provided along a partition wall of the housing and communicated with the first flushing nozzle; and a channel formed in an interior of the rotating shaft and communicated with the second flushing nozzle, wherein the housing includes, in an upper portion thereof, the partition wall vertically disposed along the longitudinal direction of the housing, and the first flushing nozzle is arranged inside the vertically-disposed partition wall.

2. The poultry carcass cooling and conveying system according to claim 1, wherein the first flushing nozzles are arranged at smaller pitch intervals than a pitch interval of the screw vanes.

3. The poultry carcass cooling and conveying system according to claim 1, wherein a position of each of the second flushing nozzles in the axial direction of the rotating shaft axially accords with a position of a base of the screw vane located at a directly opposite position in the circumferential direction of the rotating shaft.

4. The poultry carcass cooling and conveying system according to claim 1, wherein a discharge section is provided in connection to an outlet end of the housing for discharging a cooled poultry carcass outside the housing, and the discharge section comprises:

a short-axis cylindrical housing having an inlet port formed on an outlet-end-side end face of the housing for receiving a poultry carcass and a discharge port formed on an outlet-end-side upper end face of the housing;

a second rotating shaft arranged in an interior of the short-axis cylindrical housing in the same direction as the rotating shaft;

a plurality of buckets provided around the second rotating shaft to be rotatable about the second rotating shaft, for receiving and lifting a poultry carcass to discharge the poultry carcass from the discharge port;

a jacket provided around the second rotating shaft, and a plurality of third diffusion nozzles respectively provided at a plurality of positions in a circumferential direction on an outer periphery of the jacket for spraying wash water toward an inner wall of the short-axis cylindrical housing; and a second wash water supply unit which supplies wash water to the third diffusion nozzles through a channel formed in an interior of the second rotating shaft.

5. The poultry carcass cooling and conveying system according to claim 1, wherein the decontamination unit comprises:

a tank having an inlet port and a discharge port for the coolant;

a screen, a lower part of the screen is immersed in the coolant stored in the tank and an upper part of the screen has comb-like gaps provided to protrude above the surface of the coolant;

a rake for lifting a contaminant adhered on the screen by moving on the screen and a unit for moving the rake; and a fourth diffusion nozzle for spraying wash water to the screen.

6. The poultry carcass cooling and conveying system according to claim 5, wherein the fourth diffusion nozzle has a nozzle body formed of a hollow spherical body having a number of spray holes arranged in all directions to be able to spray wash water in all directions.

7. The poultry carcass cooling and conveying system according to claim 1, further comprising a fifth diffusion nozzle for spraying wash water into an interior of a duct which forms the coolant circuit and connects between the outlet of the housing and the decontamination unit.

8. The poultry carcass cooling and conveying system according to claim 1, wherein the first flushing nozzle is disposed above a surface level of the coolant in the housing during an operation of the poultry carcass cooling and conveying system.

9. The poultry carcass cooling and conveying system according to claim 1, further comprising:

a conical cover disposed around a protruding portion of the second flushing nozzle from an outer periphery of the rotating shaft.

10. The poultry carcass cooling and conveying system according to claim 1, wherein the decontamination unit comprises:

a tank having an inlet port and a discharge port for the coolant;

a screen, a lower part of the screen is immersed in the coolant stored in the tank and an upper part of the screen has gaps provided to protrude above the surface of the coolant;

a rake for lifting a contaminant adhered on the screen by moving on the screen and a unit for moving the rake; and a fourth diffusion nozzle for spraying wash water to the screen.

11. The poultry carcass cooling and conveying system according to claim 10, wherein the fourth diffusion nozzle has a nozzle body formed of a hollow spherical body having number of spray holes arranged in all directions to be able to spray wash water in all directions.

12. The poultry carcass cooling and conveying system according to claim 1, wherein the rotating shaft includes a through hole communicated in one end with the channel and communicated in the other side with an exterior of the rotating shaft, and the second flushing nozzle is provided in the through hole.

13. The poultry carcass cooling and conveying system according to claim 1, wherein the second flushing nozzle is partially embedded in the rotating shaft from the outer periphery of the rotating shaft to an inside in a radial direction of the rotating shaft.

14. The poultry carcass cooling and conveying system according to claim 3, wherein only two of the second flushing nozzle is provided in each pitch of the screw vane.

15. The poultry carcass cooling and conveying system according to claim 9, wherein the conical cover is configured to abut, in a base end surface thereof, on the outer periphery of the rotating shaft.

16. The poultry carcass cooling and conveying system according to claim 1, wherein the wash water supply unit further includes:

a high-temperature water tank that stores the wash water;

a high-temperature water piping connected with the tank, the pump and the on-off valve; and a branch portion, one end of which is connected with the high-temperature water piping and the other ends are respectively communicated with the piping that communicates with the first flushing nozzle and the channel.

17. The poultry carcass cooling and conveying system according to claim 16, wherein the wash water supply unit further includes a rotatable joint provided between the high-temperature water piping and the rotating shaft.

18. The poultry carcass cooling and conveying system according to claim 1, wherein the water piping communicated with the first flushing nozzle is arranged outside the vertically-disposed partition wall.

\* \* \* \* \*